June 19, 1945.                    C. T. ZAHN                    2,378,614
                    DEVICE FOR MEASURING YARN FRICTION
                Filed Feb. 6, 1942                2 Sheets-Sheet 1
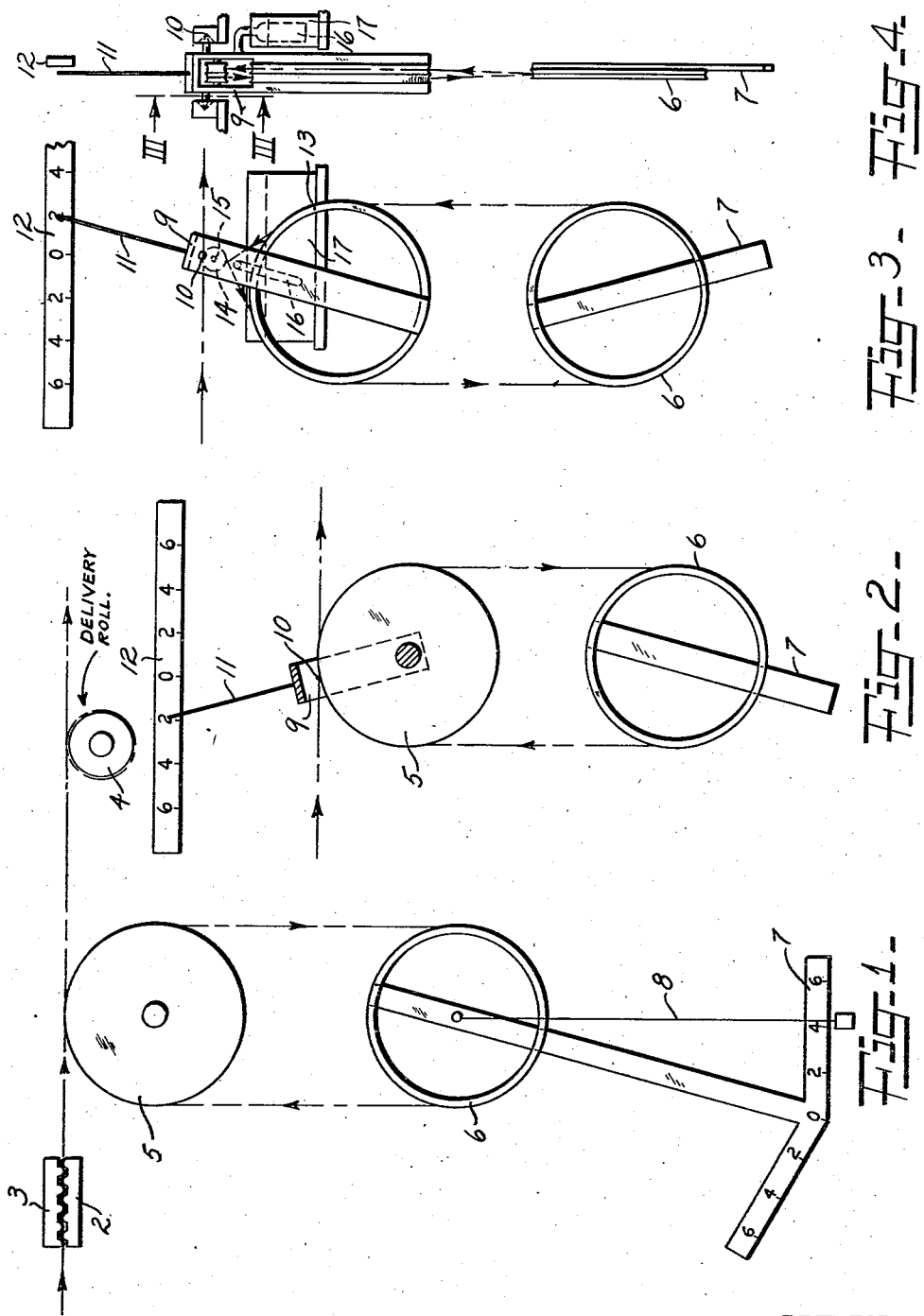
INVENTOR.
CHARLES T. ZAHN
BY Thomas R. O'Malley
ATTORNEY

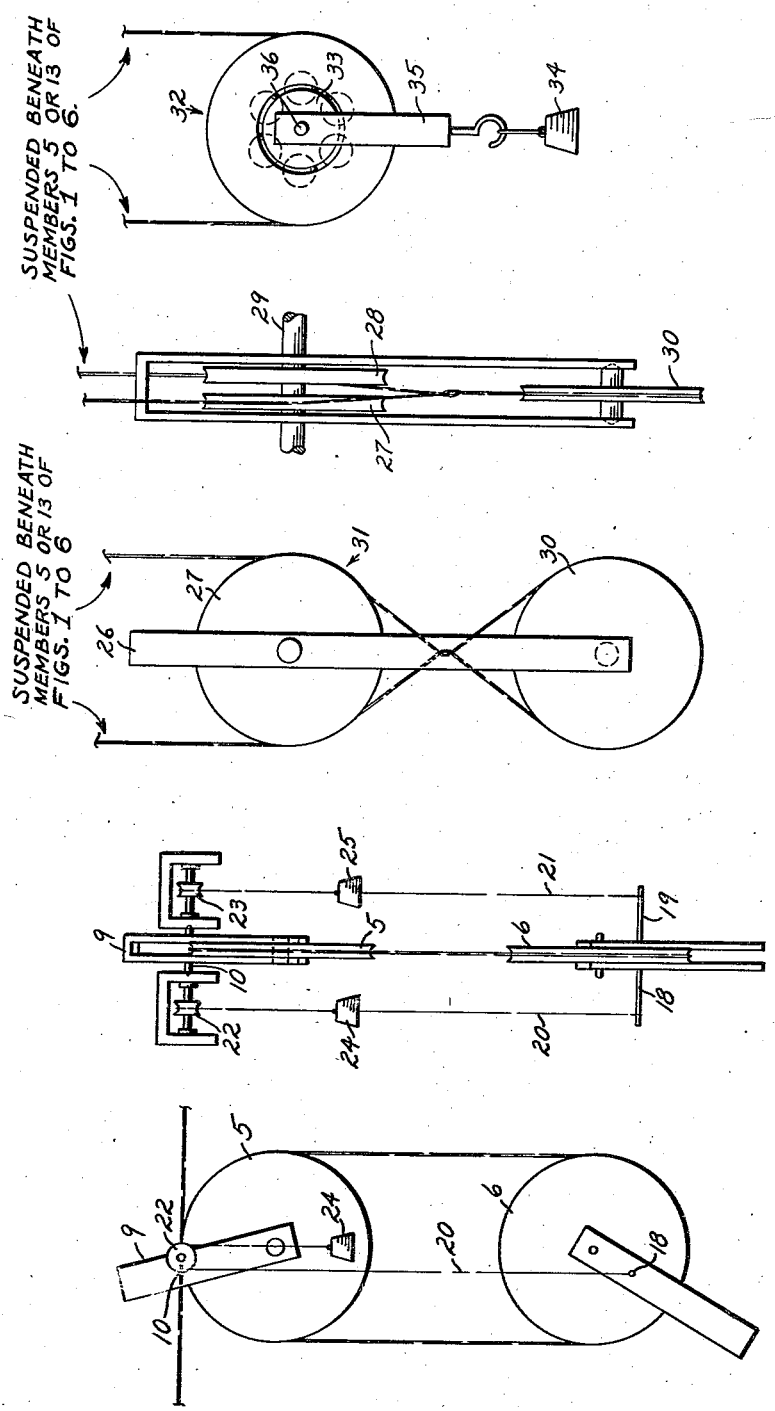

Patented June 19, 1945

2,378,614

UNITED STATES PATENT OFFICE 2,378,614

DEVICE FOR MEASURING YARN FRICTION

Charles Thomas Zahn, Wilmington, Del., assignor to American Viscose Corporation, Wilmington, Del., a corporation of Delaware Application February 6, 1942, Serial No. 429,766

20 Claims. (Cl. 73—9)

This invention relates to apparatus for measuring yarn friction with respect to metal or other surfaces and for applying such measured yarn friction for the determination of various physical entities, such as power consumption, described hereinafter. It is particularly concerned with the problem of providing a suitable device for determining the frictional characteristics of yarns finished with lubricating, softening, sizing, twist-setting, or other compounds to evaluate the suitability of such compounds and the uniformity with which they may be applied to adapt the yarns for subsequent manipulation, such as in throwing, knitting, weaving or other textile machinery.

It is an object of this invention to provide a device for measuring yarn friction without encountering the necessity to measure the tension in the yarn being tested. A further object is to provide a device which measures the friction of short portions of the yarn continuously and rapidly along the length of a continuously moving yarn. Other objects of this invention will appear from the drawings and the description thereof hereinafter. A further object is to provide a device for measuring power consumption of small machine elements, such as bearings.

The device of the invention in its simplest aspect comprises a frictional element having a cylindrical external surface of the material with respect to which the coefficient of friction of the yarn is to be determined, means for continuously moving the yarn at constant speed through a loop thereof within the lower bight of which the element is suspended in association with an eccentrically disposed weight so that the yarn must slip over the cylindrical surface of the suspended element, and a suitably arranged indicator responsive to the frictional effect developed by the slipping of the yarn with respect to the element. The indicator in the simplest embodiment may consist of a plumb bob suspended from the axis of the cylindrical element, in which event, increase in friction is indicated by an increased arc, which may be suitably calibrated to read coefficient of friction directly, between the vertical line of the plumb bob and a zero mark on the cylindrical element corresponding to the condition of rest in which the center of gravity of the eccentrically weighted cylindrical element is vertically below the axis thereof.

In the drawings, illustrative of the invention,

Figure 1 is an elevation of one form of the device,

Figure 2 is an elevation of a second form of the device,

Figure 3 is an elevation of a third form of the device, and

Figure 4 is a side view of the device of Figure 3.

Figure 5 is an elevation of a fourth form of the device,

Figure 6 is a side view of the device of Figure 5,

Figure 7 is a front elevation of another modification,

Figure 8 is a side elevation of the modification of Figure 7, and

Figure 9 is an elevation illustrating the use of the device in detecting the friction of a bearing.

Referring to what is fundamentally the simplest form of the device and its application to the measurement of yarn friction, Figure 1 shows tensioning elements 2 and 3 between which the yarn to be tested follows a sinuous course and by means of which a constant dragging force may be applied to the yarn. Any suitable means 4 for drawing the yarn through the apparatus may be employed. This means may consist of a metering godet or any constant speed roll around which the yarn is lapped one or more times to assure a non-slipping contact with the yarn. The speed of the yarn is regulated by controlling the speed of the driving roll 4. The tension grids are adjusted to prevent slipping of the yarn over the roll 5.

The yarn proceeds from the tensioning device over the rotating roll 5 (which preferably has a grooved periphery), under the friction element 6 (preferably formed with a grooved periphery), back over roll 5 and around the drawing roll 4. The friction element is eccentrically loaded by means of the scaled beam 7 fixed symmetrically thereto. A plumb line 8 is suspended from a pin located at the center of the friction element.

In operation, the frictional force exerted by the yarn against the periphery of element 6 acts at a distance from the center of the element equal to the radius thereof to produce a torque which is balanced by the opposing moment set up by the weight of the element acting through its center of gravity. Mathematical statement of the equilibrium may be made as follows:

$$T_1 + T_2 = W \tag{1}$$

$$(T_2 - T_1)r = Wh \sin\theta \tag{2}$$

$$\frac{T_2}{T_1} = e^{\mu\psi} \left(\text{or } \mu = \frac{1}{\psi} \log_e \frac{T_2}{T_1}\right) \tag{3}$$

Where $T_1$ is the tension in the yarn approaching the friction element, $T_2$ is the tension in the yarn leaving the friction element, $W$ is the total weight of the suspended element including the eccentric loading, $r$ is the radius of the element, $h$ is the distance from the center of gravity of the eccentrically loaded suspended element to the axis of the cylindrical element, $\theta$ is the angle made between a vertical line and the line through the above-mentioned axis and the center of gravity, $e$ is the Napierian logarithmic base (2.178), $\mu$ is the coefficient of friction of the yarn with respect to the friction element, and $\psi$ is the angle through which the yarn bends in passing around the friction element.

Elimination of $W$ from Equations 1 and 2 yields $$\sin \theta = \frac{r}{h}\left(\frac{T_2 - T_1}{T_2 + T_1}\right) \quad (4)$$

and substitution of the value $T_2$ obtained from (3) gives $$\sin \theta = \frac{r}{h}\left(\frac{e^{\mu\psi} - 1}{e^{\mu\psi} + 1}\right) \quad (5)$$

Since in the specific embodiment, the roll 5 and the element 6 have equal radii, $\psi = \pi$, and $$\sin \theta = \frac{r}{h}\left(\frac{e^{\mu\pi} - 1}{e^{\mu\pi} + 1}\right) \quad (6)$$

Although $e^{\mu\pi}$ varies in markedly non-linear fashion with $\mu$, nevertheless the factor in parentheses in Equation 6 varies, for all practical purposes, in nearly linear fashion with $\mu$. Hence, since $r$ and $h$ remain constant during any given determination, constituting in effect a calibration factor, $\sin \theta$, and for small angles, $\theta$ itself, is approximately directly proportional to $\mu$ itself. The indicator scale 7 may, in any event, be readily calibrated. The most important and advantageous feature of the invention is its simplicity, the fact that it gives a direct reading of $\mu$ and the fact that it avoids any necessity to measure the tensions of the yarn.

During measurement, it is only necessary by adjusting the tension grids to insure that the suspended weight is not moving up or down when readings are taken as such movement indicates that the conditions for equilibrium are not fulfilled. It has been found in many cases though not in all that the coefficient of friction varies in an unpredictable fashion with the speed with which the yarn slips over the frictional surface under examination. It is important, therefore, to specify the speed of travel at which the determination of the friction coefficient is made. Any suitable device, instead of the single metering roll 4 shown, may be used for measuring the speed of the yarn. For example, a pair of non-slip driving rolls having known delivery speeds may be used.

In Figure 2 there is shown a modification in which the torque resulting from the frictional resistance of the element 6 is transmitted to the indicating mechanism without any other direct connection to the suspended frictional element. In this arrangement, the same roll 5 as in Figure 1 is mounted for rotation within a yoke 9 which is pivoted on an axis 10 which passes through the circumference of the roll 5 parallel to its axis. The yoke 9 is provided with the indicator 11 which passes over the fixed scale 12.

The equilibrium equations for this embodiment, in which, as before, the radii of roll 5 and element 6 are equal, are as follows:

$$T_1 + T_2 = W \quad (1)$$

$$T_2(r - r \sin \theta_2) - T_1(r - r \sin \theta_2) = W_2 h_2 \sin \theta_2 \quad (7)$$

$$\frac{T_2}{T_1} = e^{\mu\psi} \quad (3)$$

Equation 7 involves the following additional definitions:

$\theta_2$ is the angle of deflection from the vertical of the yoke about its pivot, $W_2$ is the total weight of roll 5, yoke 9 and pointer 11, and $h_2$ is the distance of the center of gravity of $W_2$ from the axis 10. The following equations corresponding to (4) and (6) respectively may be derived:

$$\sin \theta_2 = \frac{1}{1 + \frac{W_2 h_2}{Wr}}\left(\frac{T_2 - T_1}{T_2 + T_1}\right) \quad (8)$$

and $$\sin \theta_2 = \frac{1}{1 + \frac{W_2 h_2}{Wr}}\left(\frac{e^{\mu\pi} - 1}{e^{\mu\pi} + 1}\right) \quad (9)$$

As in the first embodiment where $r$ and $h$ are constants or calibration factors of the given instrument, so is the factor $$\left(\frac{1}{1 + \frac{W_2 h_2}{Wr}}\right)$$

in Equations 8 and 9. This factor may be considered a sensitivity factor and may be adjusted to any predetermined value by proper design of the instrument by which $W$, $W_2$, $r$ and $h_2$ may be made to have any selected values. If desired, $h_2$ may be made equal to zero by balancing the indicating device about its pivotal axis 10 at its center of gravity. In some cases, however, the center of gravity is preferably offset below the axis 10.

In the embodiment of Figure 2, slight errors may be introduced by virtue of the fact that as the yoke is deflected from a vertical position, the yarn course approaching the roll 5 from the tensioning grids 2, 3 and that proceeding from the roll 5 to the yarn driving means 4 are slightly offset with respect to the pivotal axis 10. Ordinarily this may be disregarded, but this factor may be substantially eliminated by making use of the embodiment of Figures 3 and 4.

In Figures 3 and 4, the suspended friction element 6 is similar in all respects to that of the previously described modifications. However, the indicating means is modified. The roll 5 in Figure 2 serves two main functions. First, it provides a means for receiving the yarn without slippage from the tensioning device 2, 3 and for directing it toward the yarn driving means 4, also without slippage, in such a manner that these courses of the yarn pass substantially through the pivotal axis 10 so that they cannot exert any torque upon the indicating device; and second, it controls the angle of contact which the yarn makes with the frictional element 6 and also the direction in which the yarn courses between the suspended element and roll 5 act and exert their moments with respect to the indicating mechanism pivoted on axis 10. In Figures 3 and 4, the yoke 9 is pivoted at 10 and carries the pointer 11 in a manner similar to the instrument in Figure 2 and the scale 12 is also provided as before. However the yoke 9 carries a cylindrical member 13, either fixed therein as shown or pivoted for free rotation therein, which assumes the second function of roll 5 in the embodiment of Figure 2 described above. A small pulley wheel 14 is pivoted at 15 in the yoke in such a manner that the axis 10 passes through the uppermost point of its circumference. This pulley assumes the first function of roll 5 of Figure 2 described above, and by making it as small as possible, preferably at least as small as of the order of one twentieth of the radius of member 13 the slight errors mentioned in connection with roll 5 in Figure 2 are minimized and for all practical purposes eliminated. Where very small sizes are desired for the pulley 14, it may be replaced by a rotatable or fixed pin arranged to lead the yarn coming to and going from the instrument through the axis 10 of the indicating means. If the said pin is fixed, however, the wheel 13 must be free to rotate and to assume the second function of roll 5 in the embodiment of Figure 2 as mentioned above.

The equilibrium equations for the embodiment of Figures 3 and 4 are:

$$T_1 + T_2 = W \quad (1)$$

$$T_2(r - R \sin \theta_3) - T_1(r + R \sin \theta_3) = W_3 h_3 \sin \theta_3 \quad (10)$$

$$\frac{T_2}{T_1} = e^{\mu \psi}$$

in which R is the distance from the center of cylindrical member 13 to the pivotal axis 10, $\theta_3$ is the angle of deflection from the vertical of the indicator yoke about axis 10, $W_3$ is the total weight of indicator mechanism 9, 11, 13, 14, 15, and $h_3$ is the distance of the center of gravity of $W_3$ from the axis 10. The following Equations 6 and 9 of the previously described embodiments may be derived:

$$\sin \theta_3 = \left(\frac{r}{R + \frac{W_3 h_3}{W}}\right)\left(\frac{e^{\mu \pi} - 1}{e^{\mu \pi} + 1}\right) \quad (11)$$

As in the other embodiments, the sensitivity factor or calibration factor $$\left(\frac{r}{R + \frac{W_3 h_3}{W}}\right)$$

may be controlled or adjusted to any desired value by the proper designing of the instrument.

Oscillations and unsteadiness of the needle may be practically eliminated by attaching a vane 16 (Figure 4) to the yoke which may be immersed in a bath of liquid 17 suitably supported independently of the yoke. The proper amount of such damping may be obtained by choosing a liquid of suitable viscosity for the bath.

Zero readings of the several embodiments are made when the center of gravity of the suspended element is in a vertical line with its axis.

Whereas the embodiments of the invention show a suspended element 6 having a radius equal to the radius of the roll 5 (Figures 1 and 2) or the element 13 (Figure 3), this relationship is not essential. However, if these radii are not equal, it is advisable to take all readings with the center of the suspended element at a given distance below the center of roll 5 or member 13 to assure that the same contact angle is made by the yarn about the suspended friction element and that the courses of yarn extending between the suspended element and the roll 5 or member 13 make the same angles during all measurements. If this latter distance between the suspended element and roll 5 or member 13 is relatively large, preferably from 15 to 30 times the diameter of the suspended element, it can be shown that, to a close approximation, the only effect of the difference in radii of element 6 and roll 5 is that due to the change in contact angle from $\pi$ to some other fixed value. Of course, a number of scales may be calibrated for numerous separations of the suspended element 6 and the suspending roll 5 or member 13 for each of a plurality of ratios between the radii of suspended element and suspending member. Or tables may be set up with correction factors based on such separations and ratios.

To measure the coefficient of friction between any given yarn and any given material, it is only necessary to fasten a weight of some sort to a ring or disk (or element of various other shapes more fully explained hereinafter) formed of the material to be tested, thread the yarn to be tested through the device, suspend the weighted ring or disk in place of the element 6 of the drawings, and to adjust the driving device to obtain the desired constant speed. The instrument facilitates the determination of the uniformity with which various finishing and other dressing materials have been applied to any particular yarn and enables evaluation of the suitability of any given finishing, lubricating or other dressing material for use in preparing the yarn for various subsequent manipulations, such as by knitting machines, without the necessity of actually subjecting the yarn to the manipulation or machine on a commercial scale.

While the yarn-engaging portion of the suspended friction element is shown as a groove extending circularly about the element by virtue of the circular shape of the element, it is to be understood that the invention is not limited to a circular yarn-engaging portion. It is only necessary that the yarn-engaging portion be sufficiently smooth and sufficiently free of sharp corners that the yarn being tested can flex with respect thereto as it slips therearound with sufficient readiness to keep the instrument substantially free of jerkiness. The yarn-engaging periphery may be formed of corrugations so that the yarn makes contact only at intervals. Regardless of the shape of the yarn-engaging portion, the same considerations apply as have been described with specific reference to the embodiments shown in the drawings, the value of $\psi$ being determined by assuming that a circular friction element were being tested which had a diameter such as to give the same angular relationship between the yarn courses suspending or supporting the friction element in the same relationship. Where a corrugated or irregular surface is used against which contact with the yarn is discontinuous, $\psi$ corresponds to the total angle of bending.

It is not essential that the element be grooved. Guides may be provided upon the friction element at, near, or above the run-on and run-off points so that the yarn is guided around the element in the plane of the center of gravity of the entire suspended system. Such guides, if properly adjusted so as not to flex the yarn too sharply, introduce a negligible amount of friction. It is thus seen that the friction of yarn guides of any standard or unstandardized shape may be adapted for testing by the device of this invention merely by the attachment thereto of a weighting element and, if necessary, yarn guiding members which may be supported by or be integral with the weighting element.

When it is desired to determine the friction under loads lighter than would be possible with the normal weight of the suspended friction element which normally cannot be made of less weight than about 25 grams without great difficulty, the modification of Figures 5 and 6 may be applied. The device is the same as that of Figure 2 except that pins 18 and 19 extend at right angles to the plane of the friction element in alignment with its center of gravity. Cords 20 and 21 fastened to the respective pins 18 and 19 extend upwardly over fixed pulleys 22 and 23, their other ends being fastened to suitable exchangeable weights 24 and 25. The pulleys are supported so that the cords extending upwardly from the pins 18 and 19 pass substantially vertically through the pivot 10 of the indicating mechanism. By suitably selecting the weights 24 and 25, the effective weight of the friction element can be reduced to any desired extent, thereby extending the usefulness of the instrument to testing under lighter load conditions. Whereas in Figures 5 and 6 there are shown two sets of these weight diminishing devices 18, 20, 22, 24 and 19, 21, 23, 25, in actual practice one such device can sometimes be used without introducing an appreciable tilt of the suspended element about a horizontal axis in its own plane.

The arrangements of Figures 2 to 4 may be employed to determine other frictional relationships. For example, as shown in Figures 7 and 8 the element 6 may be replaced by a light framework 26 carrying a pair of pulleys 27, 28 on a common horizontal axis 29 above a third pulley 30. As an alternative, the two upper pulleys 27, 28 may be replaced by a single pulley containing either a single or a double groove. This framework may be suspended by means of a loop of the yarn to be tested passing down over the right side 31 of one (27) of the upper pulleys as shown in Figure 7; from there around the upwardly moving yarn course to the right side of the lower pulley 30 and around it; from there, upwardly across and in contact with itself to the left side of the other upper pulley 28 from which it ascends to the roll 5 or wheel 13 of the indicating mechanism of Figure 2 or Figure 3 respectively. By using pulleys of negligible or known friction, the friction due to the yarn whipping across itself may be directly determined from the readings of the instrument. The extraneous friction of the suspended pulley arrangement itself may be determined by running the yarn through it in the manner just described but without crossing the yarn upon itself.

The usefulness of the arrangements herein described is not confined to the study of frictional forces. In fact the Equations 4, 8, and a similar equation for the case of Figures 3 and 4, show that the indicator essentially measures the difference in two tensions, $T_2 - T_1$. Therefore, if the friction element be replaced by any mechanism which can be driven by the moving thread without slipping, this device provides a means for measuring the power required to drive the mechanism at any desired velocity. The power to be measured may be of any kind whatsoever, electromagnetic, mechanical, frictional, etc. The device should be especially useful in measuring small amounts of power such as are associated with small parts of delicate instruments. The instrument may be used, for example, for quickly testing delicate ball-bearings under arbitrary conditions of speed, load, and lubrication, as a means for controlling standards of production and for studying the effect of various lubricants.

For example, in Figure 9, the device is applied as a dynamometer to determine the power consumed in driving a small ball bearing. The indicating, yarn tensioning, and yarn-driving mechanism of this embodiment may be that of Figures 2 or 3 and freely suspends in the bight of the yarn a ball bearing 32, the inner race 33 of which has imparted to it any preselected weight 34 (corresponding to anticipated working conditions) by means of a suitable yoke 35 within which the axle 36 of the bearing is mounted for rotation. The yarn is driven at constant speed which may be preselected to cause rotation of the bearing corresponding to anticipated conditions of operation, and the power consumed by friction may be calculated from the various set factors and the readings obtained from the indicating mechanism.

The device may also be applied in any other relationships where the measurement of difference in tensions between two suspending courses of a yarn, whether moving or stationary, is desired. For example, the center of gravity of an irregular body may be found by suspending the body in several successive positions from the indicating mechanism of Figure 2 or of Figures 3 and 4 while maintaining the yarn stationary. In each such position, the center of gravity of the suspended element falls vertically below the pivot 10 of the indicating mechanism and by means of simple calculations the position of the center of gravity may be determined as a function of the reading of the instrument. Where the difference in tension of stationary suspending yarn courses is desired, the upper ends of the yarn need not extend away from the roll 5 or element 13 of the indicator device. For example, these upper ends may be attached to the upper portion of the periphery of roll 5 or element 13, it being only necessary that the rotation of such roll or element in attaining equilibrium be insufficient to take either point of attachment of the yarn ends beyond the point of tangency of the depending yarn courses.

While preferred embodiments of the invention have been disclosed, the description is intended to be illustrative only, and it is to be understood that changes and variations may be made without departing from the spirit or scope of the invention as defined by the appended claims.

What I claim is:

1. Apparatus comprising means responsive to the difference in tension of a pair of yarn courses comprising a device having a yarn guiding surface and adapted to be freely suspended by a yarn looped around at least a portion of said surface the weight of the device being arranged in a fixed eccentric relation to the yarn-guiding surface.

2. A device comprising a cylindrical element having a yarn-guiding surface, said device being adapted to be freely suspended by a yarn looped around at least a portion of said surface, and a weight fixedly attached to said element to offset the center of gravity of the device from the axis of the element.

3. In apparatus for testing yarn friction, a suspended system comprising an element having a yarn-guiding surface whose frictional characteristics are to be ascertained, a weight fixedly attached to said element to offset the center of gravity of the assembly of element and weight from the axis of the element so that said element may be freely suspended by a loop or bight of yarn to be tested with said surface in engagement with the suspending yarn, and means on said element for guiding said yarn loop around said element substantially in the vertical plane through the center of gravity of the suspended system.

4. In apparatus for testing yarn friction, a device comprising a cylindrical friction element having a groove in its periphery, said device being adapted to be freely suspended by a yarn passing through said groove, and a weight fixedly attached to said element to offset the center of gravity of the device from the axis of the element.

5. In apparatus for testing yarn friction, a friction element having a yarn-engaging surface, means for freely suspending said element in a loop of a yarn to be tested, an eccentric weight fixedly attached to said element, and means for drawing the yarn over said surface at substantially constant speed.

6. In apparatus for testing yarn friction, a cylindrical friction element, means for freely suspending said element in a bight of a yarn to be tested, an eccentric weight fixedly attached to said element, means for drawing said yarn through said bight in sliding contact with said element and indicating means responsive to the frictional resistance to such sliding.

7. In apparatus for testing yarn friction, an eccentrically weighted friction element, means for freely suspending said element in a bight of a yarn to be tested, means for drawing said yarn at constant speed through said bight in sliding contact with said element, said suspending means comprising a pivoted means responsive to the difference in tension in the suspending courses of the yarn set up by said sliding for indicating the frictional characteristics of said element with respect to said yarn.

8. In apparatus for testing yarn friction, an eccentrically weighted friction element, means for freely suspending said element in a bight of a yarn to be tested, means for drawing said yarn at constant speed through said bight in sliding contact with said element, said suspending means being pivoted as a unit upon an axis, means for directing the yarn as it first approaches and also as it ultimately leaves the suspending means substantially along a line intersecting said axis, said suspending means comprising a pivoted means responsive to the difference in tension in the suspending courses of the yarn set up by said sliding for indicating the frictional characteristics of said element with respect to said yarn.

9. In apparatus for testing yarn friction, an eccentrically weighted friction element, means for freely suspending said element in a bight of a yarn to be tested, means for drawing said yarn at constant speed through said bight in sliding contact with said element, said suspending means comprising a pivoted yoke, a cylindrical member mounted in said yoke with its circumferential line substantially coincident with the pivotal axis of the yoke, and an indicator associated with said yoke.

10. In apparatus for testing yarn friction, an eccentrically weighted friction element having a circular periphery, means for freely suspending said element about its periphery in a bight of a yarn to be tested, means for drawing said yarn at constant speed through said bight in sliding contact with said element, said suspending means comprising a pivoted yoke, a cylindrical member rotatably mounted in said yoke with its circumferential line substantially coincident with the pivotal axis of the yoke and an indicator associated with said yoke.

11. In apparatus for testing yarn friction, an eccentrically weighted friction element, means for freely suspending said element in a bight of a yarn to be tested, means for drawing said yarn at constant speed through said bight in sliding contact with said element, said suspending means comprising a pivoted yoke, a relatively small cylindrical member mounted in said yoke with its circumferential line at its normally uppermost point substantially coincident with the pivotal axis of the yoke, a relatively large cylindrical member mounted in said yoke below said small cylindrical member and an indicator associated with said yoke.

12. In apparatus for testing yarn friction, an eccentrically weighted friction element having a circular periphery, means for freely suspending said element about its periphery in a bight of a yarn to be tested, means for drawing said yarn at constant speed through said bight in sliding contact with said element, said suspending means comprising a pivoted yoke, a small cylindrical member mounted rotatably in said yoke with its circumferential line at its normally uppermost point substantially coincident with the pivotal axis of the yoke, a large cylindrical member mounted in said yoke below said small member and having a diameter of the order of at least 20 times that of the small member, and an indicator associated with said yoke.

13. An apparatus comprising means responsive to the difference in tension of a pair of yarn courses depending therefrom, said means comprising a pivotally mounted member having a yarn-guiding surface from which the yarn courses depend, and means for maintaining the depending yarn courses at substantially the same distance apart regardless of the angular position of the pivoted member.

14. An apparatus comprising means responsive to the difference in tension of a pair of yarn courses depending therefrom, said means comprising a member having at least those portions of its periphery from which said courses depend of substantially circular contour, and means for supporting said member, said supporting means being pivoted on an axis above the center of curvature of the circular portions of said member.

15. An apparatus comprising means responsive to the difference in tension of a pair of yarn courses depending therefrom, said means comprising a circular member from which said courses depend, and means for supporting said member, said supporting means being pivoted on an axis tangent to said member and parallel to its axis.

16. An apparatus comprising means responsive to the difference in tension of a pair of yarn courses depending therefrom, said means comprising a pivoted yoke, and a circular member from the periphery of which the yarn courses depend, said member being arranged in the yoke so that its periphery intersects the pivotal axis of the yoke.

17. An apparatus comprising means responsive to the difference in tension of a pair of yarn courses depending therefrom, said means comprising a pivoted yoke, and a circular member from the periphery of which the yarn courses depend rotatably mounted in said yoke, said member being arranged in the yoke so that its periphery intersects the pivotal axis of the yoke.

18. An apparatus comprising means responsive to the difference in tension of a pair of yarn courses depending therefrom, said means comprising a pivoted yoke, a circular member mounted in said yoke below its pivotal axis, a relatively small circular member mounted in said yoke between the first-mentioned member and the pivotal axis with its circumferential line at its normally uppermost point coincident with said axis.

19. In an apparatus for testing yarn-to-yarn friction, means for directing a running yarn across and in contact with a second course of said running yarn, means for freely suspending said first-mentioned means in a loop of the yarn to be tested, means for drawing said yarn at constant speed through said intercrossing relationship, said suspending means comprising a pivoted means responsive to the difference in tension in the suspending courses of the yarn set up by the yarn intercrossing friction for indicating the frictional characteristics of said yarn with respect to itself.

20. In apparatus for testing yarn-to-yarn friction, means for supporting a pulley system on an axis above that of a lower pulley, means for freely suspending said pulley system in a loop of a yarn to be tested, the yarn being intercrossed with itself between the upper and lower pulleys, said suspending means comprising a pivoted means responsive to the difference in tension in the suspending courses of the yarn set up by said yarn intercrossing for indicating the frictional characteristics of said element with respect to the said yarn, and means for drawing said yarn at constant speeds through said pulley system and suspending means.

CHARLES THOMAS ZAHN.